United States Patent [19]
Nagel

[11] 3,866,731
[45] Feb. 18, 1975

[54] SPEED RESPONSIVE CLUTCH

[75] Inventor: George W. Nagel, Pittsburgh, Pa.

[73] Assignee: Westinghouse Electric Corporation, Pittsburgh, Pa.

[22] Filed: July 25, 1973

[21] Appl. No.: 382,422

[52] U.S. Cl............ 192/104 C, 192/35, 192/114 R
[51] Int. Cl............................................ F16d 43/16
[58] Field of Search........ 192/35, 71, 103 B, 104 C, 192/105 BB, 114 R

[56] References Cited
UNITED STATES PATENTS

| | | | |
|---|---|---|---|
| 1,745,738 | 2/1930 | Carter, Jr................... | 192/103 B X |
| 2,179,927 | 11/1939 | Fishburn...................... | 192/105 BB |
| 2,210,668 | 8/1940 | Hopkins..................... | 192/105 BB X |
| 2,278,623 | 4/1942 | Orr............................... | 192/105 BB |
| 2,448,539 | 9/1948 | Maurer...................... | 192/105 BB |
| 3,142,202 | 7/1964 | Muhlbeyer................. | 192/104 C X |

Primary Examiner—Allan D. Herrmann
Attorney, Agent, or Firm—F. A. Winans; C. F. Renz

[57] ABSTRACT

A speed responsive clutch interposed between two drive means for transmitting torque without slippage from a first drive means operated in an intermittently reversing direction or disengaging to permit a second high speed drive to transmit torque to a common driven member without also driving the first drive means. The clutch includes two mutually engageable members which when engaged transmit torque in either direction without slipping. Each member is drivingly associated with one of the drive means, with the members being engaged generally whenever the first drive means is energized and disengaged by centrifugal force whenever the second drive means is energized and the first drive means deenergized. The clutch members, subsequent to being disengaged, will reengage only when the second drive means is deenergized and the clutch member associated with that drive means slows to less than the disengaging speed and is substantially at synchronous speed with the clutch member associated with the reenergized first drive means.

8 Claims, 9 Drawing Figures

SPEED RESPONSIVE CLUTCH

BACKGROUND OF THE INVENTION

1. Field of the Invention

This invention relates generally to speed responsive clutch mechanisms and more particularly to such a clutch mechanism which disengages at a relatively high speed and reengages for positive drive in either direction at slower speeds.

2. Description of the Prior Art

The present invention is concerned primarily with providing a less expensive drive system for commercial type horizontal or inclined axis clothes washing machines. Such machines typically include a clothes containing tub that, during the wash mode, is driven at a relatively low speed (i.e., 60 rpm) and intermittently reversed. During the spin/dry cycle the same tub must be driven at a relatively high speed (i.e., 460 rpm). Heretofore, the tub was directly coupled via a V-belt to a two-speed reversible motor. As such a motor was wound specially for this purpose and as the volume was relatively low, the motor was quite expensive. Further, such a motor required auxiliary forced air cooling when operating in the low speed mode. This further increased the system cost. It was determined that elimination of the single expensive drive motor in favor of two separate standard single speed motors, one of which is reversible, would result in a substantial cost reduction. However, since one motor, during the wash mode, must drive the tub in either direction of rotation, a one-way clutch could not be utilized in the drive train. Further, simply coupling two motors directly to a common shaft of th tub would require the wash motor to drive the spin motor during the wash portion of the cycle and, alternatively, the spin motor to drive the wash motor during the spin/dry operation. Thus, during wash, the spin motor would be driven at approximately one/eighth speed, which would be acceptable. However, during spin/dry operation, the wash motor would be driven at approximately eight times its normal operating speed. Such high overspeed would develop a prohibitive wind noise as well as cause serious bearing problems in the low speed wash motor.

To prevent the high speed motor from driving the low speed motor during the spin operation, the drive system requires a disconnect between the two motors which can be made responsive to a speed which of necessity is higher than the normal operating speed of the wash motor requiring some overspeed of this motor prior to disengagement, but considerably lower than that corresponding to the operating speed of the spin/dry motor. However, as the wash motor must be reengaged for a subsequent wash operation after the initial spin/dry operation, reengagement of the drive to the low speed motor at just less than the clutch speed which initiated the disengagement, as would be normal if the clutch engagement was solely centrifugally controlled, could result in a large inertial shock on the system generally accompanied by momentary high stressses which would require overdesign from normal conditions and negate any previously gained cost advantage.

Under the above operating conditions, a simple centrifugal clutch between the drives of the two motors would not be satisfactory. In the first place, the clutch mechanism must be capable of handling wash torques in both directions up to normal wash speed but of disconnecting the wash motor before it can attain an excessive overspeed after the spin/dry motor is energized. This action is opposite to that of the commonly known centrifugal clutch which is disengaged below a set speed and engaged above this speed. Further, the reengagement of the low speed drive must be accomplished at a speed which is distinct from the disengaging speed and preferably when there is a close speed match between the two drives to minimize reengagement shock and its attendant problems.

SUMMARY OF THE INVENTION

This invention provides a speed responsive clutch mechanism for transmitting torque without slippage and interposed between two optionally energized drive means. One drive means is operable in a reversible mode and coupled to the driven member through the clutch mechanism for operation of the driven member and the other drive means is operable in a unidirectional high speed mode for direct drive of the driven member. During high speed operation the clutch mechanism disengages at a predetermined speed range above its normal speed when driven by the first drive means to free the first drive means from being driven in a high speed mode, and reengages only when the high speed member of the clutch returns to less than the disengaging speed and is nearly synchronous with the speed of the low speed member of the clutch.

DESCRIPTION OF THE PREFERRED EMBODIMENT

Figure 1:
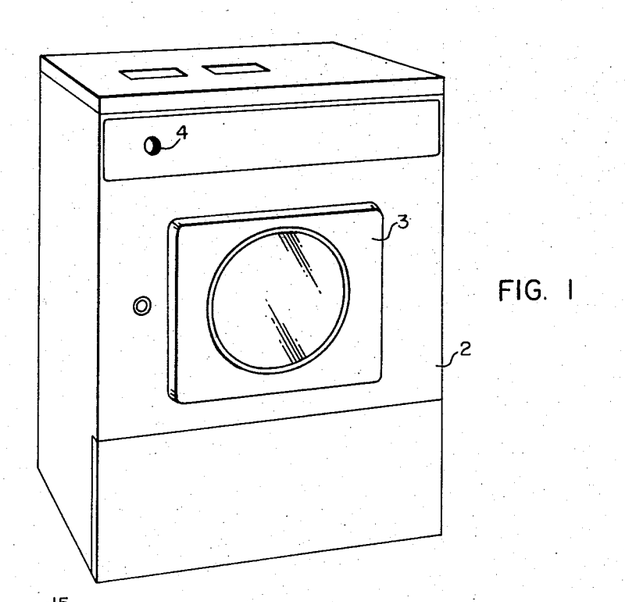
FIG. 1 is a front perspective view of a horizontal axis washing machine.

As previously stated, the present invention is utilized as a less costly drive for horizontal axis automatic washing machine of the type generally manufactured for heavy duty commercial use and which has a wash cycle wherein the clothes tub is reversibly driven. Such a machine is shown in FIGS. 1 and 2 and as therein seen generally comprises an outer cabinet 2 having on its front face a hingedly mounted forwardly opening door 3 and a control panel including a switch means 4 associated with a timer to control the operation of the machine as is well known in the art.

Internally of the cabinet 2 the machine generally includes an outer stationary tub 6 mounted on a tub support frame 7 and an inner concentric rotatable clothes tub 8 supported for rotation on a rear shaft 9 through a bearing structure in the stationary tub. The rear shaft 9 is drivingly coupled to a pulley member 10 for driving the tub 8 in accordance with the drive to the pulley member 10. Other specific structure and operative components such as a pump and pump motor, valves, hoses, and electrical wiring are housed within the cabinet 2 but are not shown as such apparatus is also thought to be well known.

Figure 2:
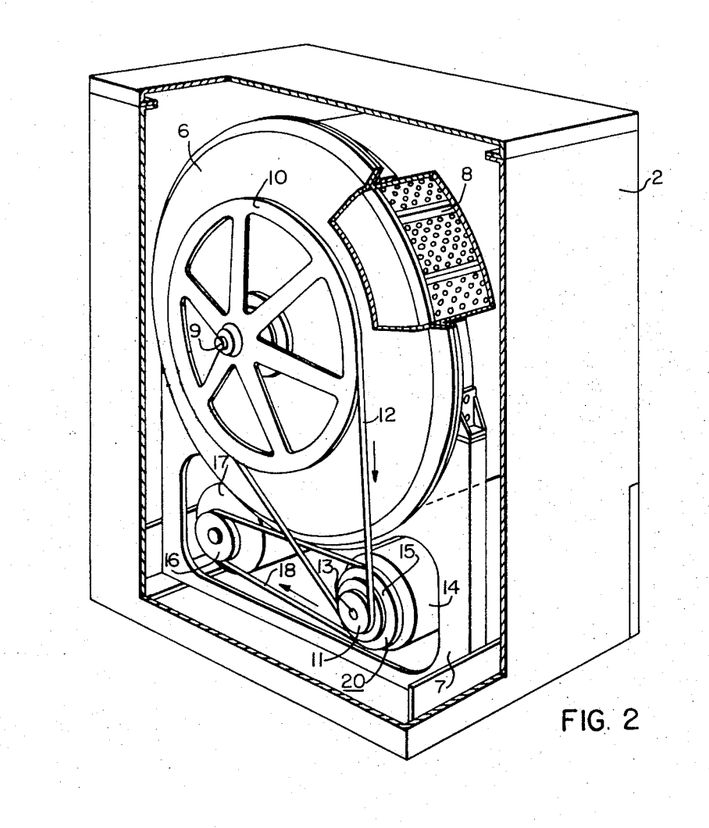
FIG. 2 is a rear perspective view of the washing machine of FIG. 1 with parts broken away to show the general drive system of the present invention.

As this invention is primarily concerned with the drive system of such an appliance, FIG. 2 shows the general arrangement such a drive system would have. Referring thereto, it is seen that the driven pulley member 10 is drivingly coupled to a small pulley 11 via a V-belt 12. Pulley 11 is keyed to the shaft 13 of a motor 14 which is hereafter referred to as the spin motor. The shaft 13 of the spin motor 14 also has mounted thereon a driven pulley member 15 which is drivingly coupled to a driving pulley 16 of a second motor 17 via a V-belt 18. This second motor 17 is a reversible motor and will hereafter be referred to as the wash motor.

From this arrangement it is seen that during the wash mode, with motor 17 energized and motor 14 deenergized, the drive of motor 17 must be transmitted to the pulley 10 through drivingly engaged pulleys 11 and 15 on shaft 13 of motor 14. However, during spin, with motor 14 energized, drive is transmitted to the pulley 10 directly from pulley 11. It is at this time that the driving engagement previously existing between pulleys 11 and 15 must be disconnected or motor 17 will be driven in a relatively high overspeed condition. Thus, proper engagement and disengagement between the pulleys 11 and 15 on shaft 13 is accomplished by a speed responsive clutch mechanism 20 of the present invention.

Figure 3:
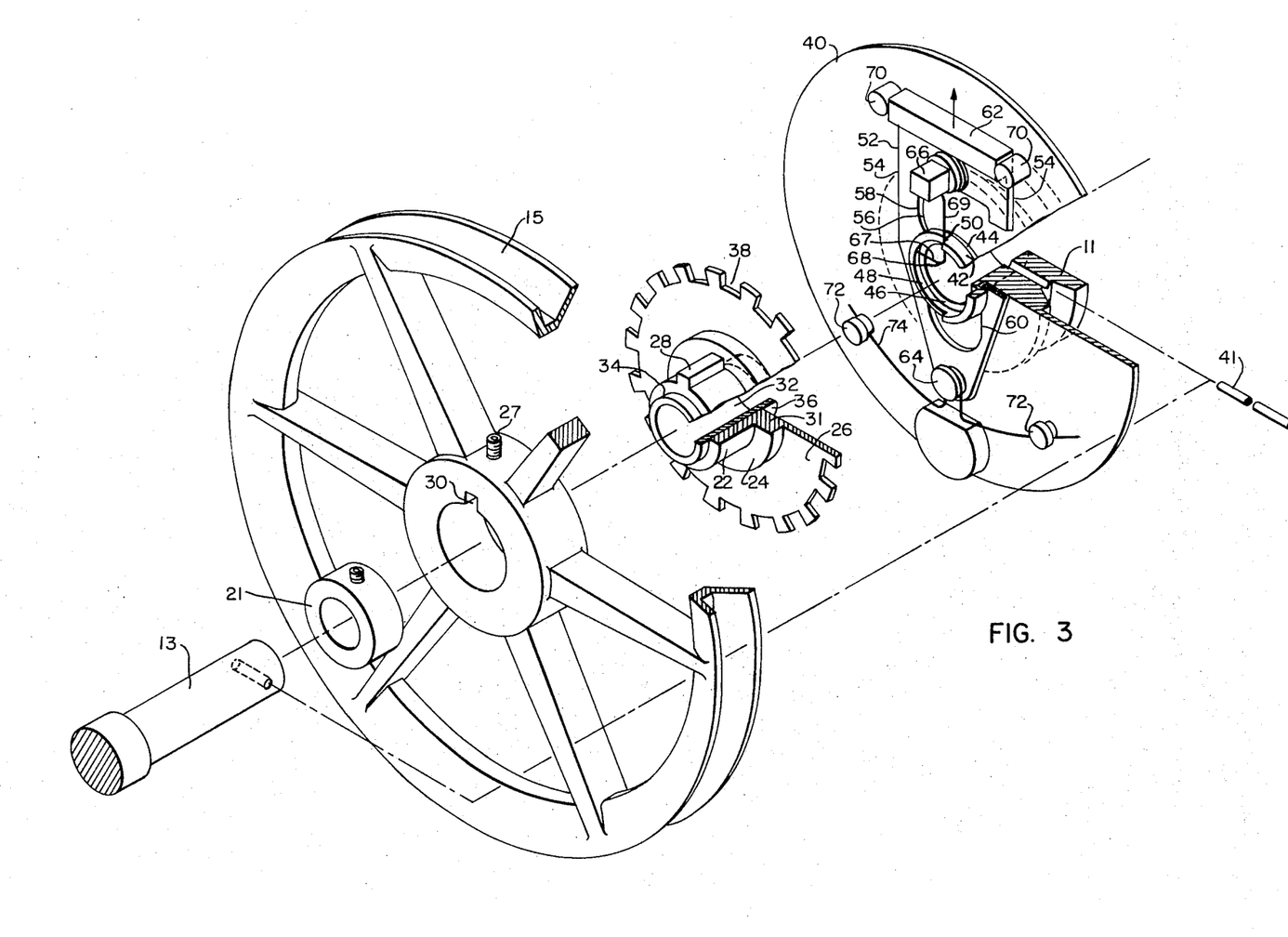
FIG. 3 is an exploded perspective view of the speed responsive clutch mechanism of the present invention.
Figure 4:
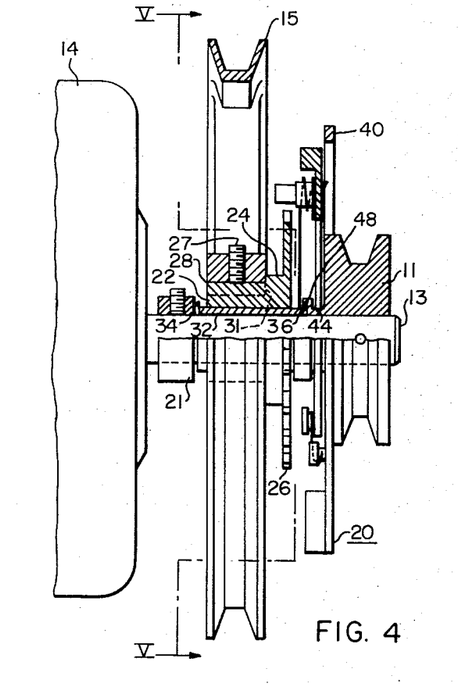
FIG. 4 is a side elevational view of the mechanism of FIG. 3 partially showing an axial cross-sectional view.

Referring now to FIGS. 3 and 4, the separate components of the mechanism 20 are clearly shown as mounted on the shaft 13 of the spin motor 14. Thus, progressing from adjacent the motor 14 outwardly along the shaft 13, the assembly includes a collar 21 having a set screw tightly engaging the shaft to prevent axial movement of the assembly toward the motor. Next, the driven pulley 15 is mounted on an axially extending portion 22 of the hub 24 of a notched wheel 26. The portion 22 also defines a key 28 for engagement in a keyway 30 of the pulley 15 for direct drive between the pulley 15 and the notched wheel 26. A set screw 27 is provided to prevent their axial relative displacement.

Further, it will be noted, the hub 24 extends axially from the face of the notched wheel 26 adjacent the pulley 15 and has a stepped configuration as at 31 to maintain the proper axial separation between the wheel 26 and the pulley 15. A bushing member 32 is pressed into the hub 24 of the notched wheel 26 so that the notched wheel, including the bushing, is free to rotate on the shaft 13. The bushing extends a short distance axially on either side of the wheel 26 as at 34 and 36 to abut other adjacent components between which there is or can be relative rotation. It should also be noted that the entire periphery of the notched wheel 26 defines parallel-sided notches as at 38. The notched wheel 26 and the extension 36 of bushing 32 generally comprise that portion of the clutch mechanism referred to as being drivingly associated with the low speed drive means.

The remaining components of the clutch mechanism are generally associated with the high speed drive or spin motor and include a centrifugal plate 40 intimately attached to the inner face of the driven pulley 11, as by brazing. Pulley 11 is directly driven by the shaft 13 as through a pin 41 which also prevents its axial displacement. the hub of the centrifugal plate 40 defines an axially extending sleeve portion 42 facing the notched wheel 26, with the outer periphery of the sleeve 42 immediately adjacent the plate having a reduced outer diameter with respect to the remainder of the sleeve so as to define an outer circumferential notch 44. The terminal end of the sleeve adjacent the notched wheel 26 further defines an inner diameter having a stepped configuration forming an inner face 46 which abuts the end 36 of bushing 32 and is encircled by a circumferential axially extending collar 48. The collar 48 is axially notched to provide a positive abutment shoulder 50 for a purpose to be fully explained later.

A movably mounted slide member 52 is mounted on the plate 40 for relative radial movement induced by centrifugal force as the plate 40 rotates. In this regard, the slide member 52 comprises an elongated substantially flat metal piece having, for the most part, generally parallel sides 54 and defining an internal keyhole shaped opening 56, with the large end of the opening 58 large enough to permit insertion therethrough of the sleeve 42 and the elongated narrow portion 60 of the opening 56 slidably received in the outer notch 44 of the sleeve 42. The sides of the narrow portion 60 of the opening are parallel to each other and to the sides 54.

Figure 5:
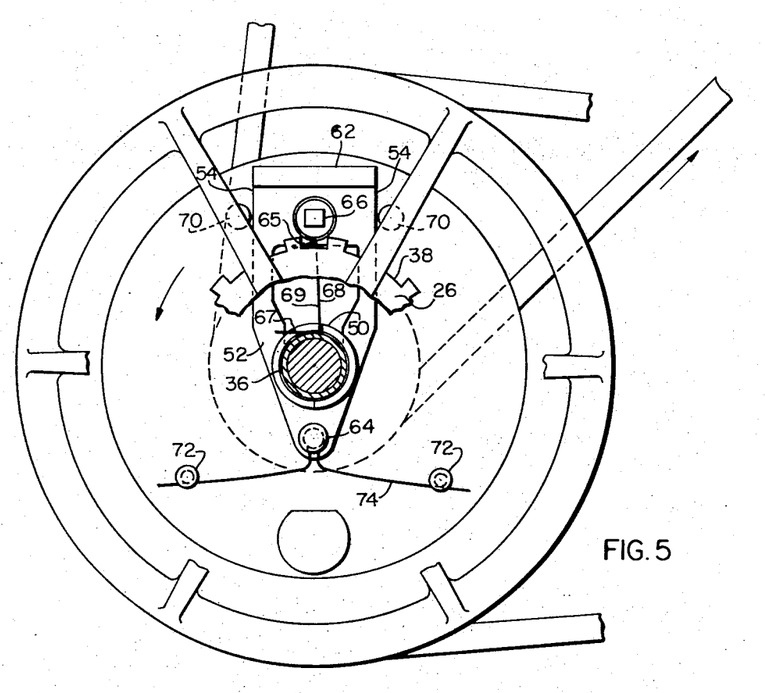
FIG. 5 is a rear elevational view taken generally along V—V of FIG. 4 showing the mechanism disengaged.

As viewed in FIGS. 3, 4 and 5, the upper portion of the slide 52 is enlarged as at 62 to provide a weighted end and the lower or opposite end includes a spring retaining button 64. A rectangular post 66 extends outwardly axially towards the notched wheel 26 from the upper end of the slide member 52 with the dimension of the post being such that it can easily fit within the notches 38 of the wheel 26 for driving engagement therewith. A spring wire form 68, having the general cofiguration of an L is attached to the slide member as by the upper end of the leg of the L circumferentially wrapped about a portion of the post 66 and terminating in a reversely bent clip 65 to engage the back of the slide 52 and prevent the wire form 68 from slipping off the post. The opposite end of the leg portion 69 of the L extends downwardly adjacent to the abutment shoulder 50 of the sleeve member 44 and is normally biased to a position substantially abutting shoulder 50. The free end of the wire form terminates in a foot portion 67.

Two stationary guides 70 attached to the plate 40 abut opposite sides 54 of the slide to guide its radial movement and two spring retaining projections 72 are integrally attached to the plate 40 to retain the free ends of a wire spring 74, the midpoint of which engages the button 64 on the slide to oppose the centrifugal force on the slide during rotation of the plate 40.

Figure 6:
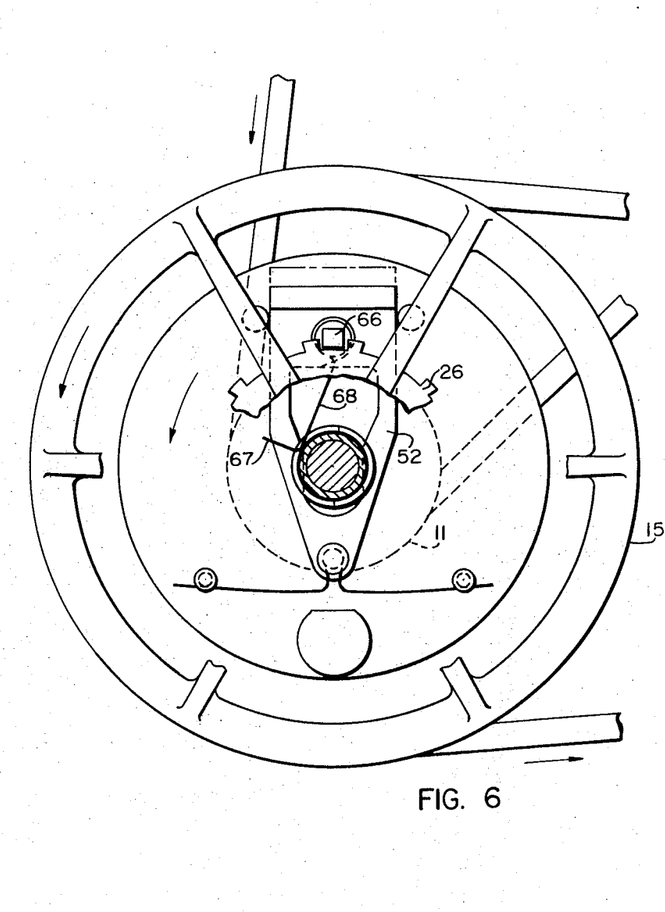
FIG. 6 is a view similar to FIG. 5 showing the mechanism engaged for transmitting reversible drive.

As seen more clearly in FIG. 4, when assembled, the foot portion 67 of the L shaped wire 68 normally rests on extending end 36 of the bushing 32 of notched wheel 26. The length of the wire form 68 is such that in this position, the post 66 is maintained radially outwardly of the notched wheel 26 although the spring 74 is normally biasing the slide in a direction to move the post 66 radially inward. (See FIG. 5 showing the position of the L shaped wire form 68 when preventing the engagement of the post within the notches 38). In this relative relationship it is seen that pulleys 15 and 11 are free to rotate independently of each other (pulley 11 being directly driven by the shaft 13 and pulley 15 along with the notched wheel 26 being mounted freely on the shaft). However, under certain conditions which will hereafter be explained in greater detail, the foot portion 67 of the wire form 68 is moved radially outwardly as shown in FIG. 6 and releases the slide member 52 whereupon the spring 74 causes the post 66 to move radially inwardly until seated within a notch 38 of the notched wheel 26. Under these conditions, the pulleys 11 and 15 are directly drivingly engaged so that rotation of either in either direction causes rotation of the other in the same direction without slippage.

It is to be understood that during the wash portion of the cycle the post 66 is seated within a notch 38 of the notched wheel 26 as above described and the spin motor 14 is not energized. Thus, the wash motor, as previously explained, drives pulley 15 which through the described engagement drives pulley 11 which is drivingly connected to the tub 8 as also explained.

Once the timer controlled wash cycle advances to the spin portion of the cycle, the spin motor 14 is energized and the wash motor 17 deenergized. The direct drive between the motor 14 and the pulley 11 gradually increases the speed of plate 40. During the initial increase in speed of motor 14, the wash motor continues to be driven through the still engaged notched wheel 26 and post 66. However, as the speed of the plate 40 increases to a predetermined range somewhat greater than that when driven by wash motor 17 when running at synchronous speed, the spring force of spring 74, by design, is overcome by the centrifugal force induced by the weighted end 62 of slide 52, forcing the slide 52 to move and thereby moving post 66 radially outwardly to a position freeing it of engagement within the notched wheel 26. In this position of the post 66 the wash motor is no longer driven by the spin motor and is free to coast to a stop while the spin motor continues to spin the tub 8 through pulley 11.

It is to be noted that the final radial outermost position of post 66 which can be determined by a stop member abutting the slide or by the length of the opening 60, is sufficient to move the spring form 68 to a position where the leg 69 thereof is free of the extension 36 of bushing 32. Thus, due to its inherent resiliency, the leg 69 of the spring form 68 moves into an abutting position with respect to shoulder 50 on collar 48. In this position the foot portion 67 of the spring form 68 is radially outwardly of the extension 36 in the direction of permitted movement of the slide.

Assuming the above spin cycle was at some intermediate portion of the total washing cycle and is subsequently followed by another wash cycle, at the termination of the spin cycle the timer would deenergize the spin motor and reenergize the wash motor. The wash motor, being under a no-load condition, thus accelerates to generally its synchronous speed concurrently with the spin motor and clothes tub coasting to continuously slower speeds.

As spin motor 14 decelerates, the centrifugal force on the weighted end 62 of the slide 52 decreases to the extent the slide comes under the returning influence of spring 74. However, spring 74 can only move slide 52 to the extent permitted by spring form 68, whose foot portion 67 contacts extension 36 of bushing 32 which ultimately is driven by pulley 15. At this time the speed of pulley 15 at synchronous speed of wash motor 17 continues to be less than the coasting speed of plate 40 such that until there is a speed match between the plate 40 and the notched wheel 26, there is relative rotation of the plate 40 with respect to the notched plate 26 in a direction such that the inherent resiliency of the spring form is assisted by a frictional drag between the foot 67 and the extension 36 of bushing 32 to maintain the spring form in abutment with shoulder 50 thereby maintaining the spring form in a position supporting the post 66 out of engagement with the notches even though the slide is under the influence of spring 74. (It should be noted that the arrow in FIG. 5 indicates the direction of rotation of the spin motor and thus the plate 40 whenever the plate is under the influence of the spin motor. The direction of rotation of pulley 15, as driven by the wash motor, can be in either direction; however, even if pulley 15 were rotating in the same direction as plate 40, its rotational speed at synchronous speed of motor 17 would be slower than plate 40 so that the resultant direction of relative rotation between them until a speed match exists is in the direction of the arrow.)

Once the relative direction of rotation between plate 40 and notched wheel 26 reverses, which happens substantially immediately after the spin motor and tub have coasted to a speed match with the driven pulley 15, the direction of frictional drag on the foot portion 67 of spring 68 reverses. This frictional force being sufficient to overcome the normal bias of spring form 68 immediately forces the foot portion to a non-supporting position as shown in FIG. 6 whereupon the slide moves under the influence of spring 74, carrying the post 66 into engagement with any one of the notches 38 on the notched wheel 26. This restores the driving engagement between the pulley 15 and pulley 11. As this occurs at substantially synchronous speed between these two pulleys there is minimal inertial impact associated therewith. The drive system is now in condition for non-slipping reversible drive as dictated by wash motor 17 during the wash portion of the cylce.

In a working embodiment of the above described drive system, the spin motor 14 was a 2-pole 60 Hz motor with a full load operating speed of 3,450 rpm. The wash motor 17 was a 6-pole 60 Hz motor with a working speed of 1,140 rpm and a synchronous speed of 1,200 rpm. To obtain the desired speed ratio between agitating and spinning the clothes tub of 8:1, the pulleys 15 and 16 had an 8:3 ratio. Wash speed for the shaft 13 and thus the clutch mechanism was thus approximately 450 rpm. The spring 74 was selected so as to overcome the centrifugal force being developed by slide 52 at approximately 550 rpm, and to have a relatively low spring constant. As the slide moved inward the centrifugal force developed by the weighted end decreased immediately as a function of its decreasing radius of rotation. As the speed of rotation of plate 40 decreased until a speed match with pulley 15 existed, the centrifugal force decreased still further so that spring 74 was able to provide a good snap-action to the slide once the support of spring form 68 was removed. The rpm necessary to develop sufficient centrifugal force to move the slide initially outward against the force of the spring is, of course, above the 550 rpm that previously permitted the slide to initially move inward since the radius of rotation of the slide has been reduced. However, since centrifugal forces are proportional to the square of the speed, the disengagement of the post 66 and the notched wheel occurred at only 600 rpm. Although this corresponds to a slight overspeed of the wash motor 17, with the wash motor deenergized there was no problem in doing this.

Further, it is apparent that the relationship between the centrifugal force on the slide and the spring 74 is such that the movement of the slide from its outermost position to the position it is under the influence of the spring 74 but prevented from movement by spring form 68 must occur while plate 40 is still revolving (although coasting) appreciably faster than the notched wheel 26 to accommodate manufacturing variation. For should the slide be prevented from moving inwardly until the speed of the plate was slower than the notched wheel there would be immediate engagement of the post 66 with notched wheel 26 at a speed mismatch that would have the highly undesirable inertial shock on the whole system.

Figure 7:
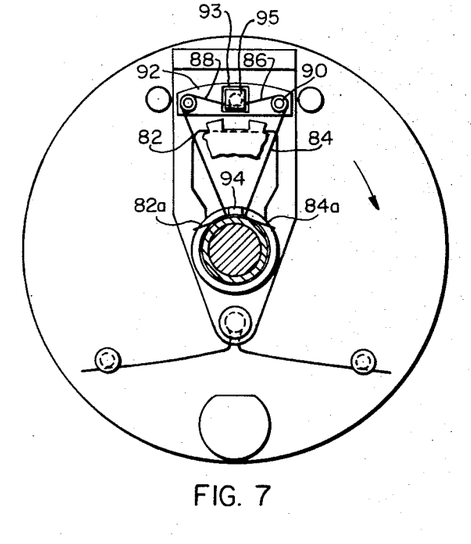
FIG. 7 is a view similar to FIG. 5 of another embodiment of speed responsive clutch mechanism.
Figure 8:
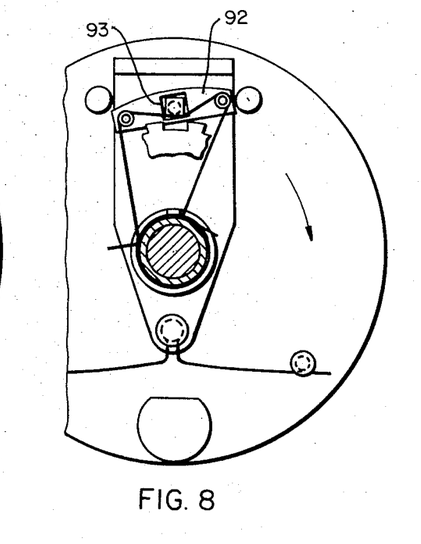
FIG. 8 is a view of the embodiment of FIG. 7 showing the mechanism progressing toward reengagement.
Figure 9:
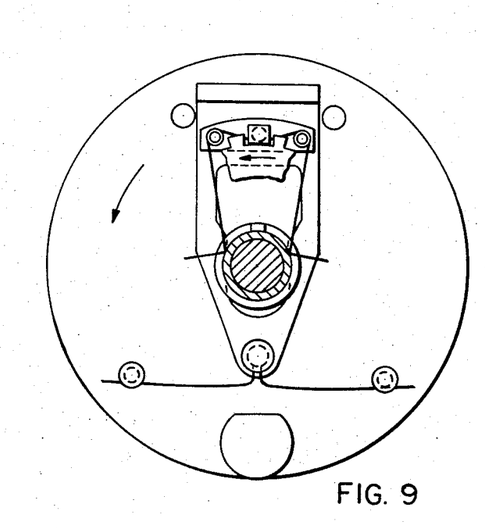
FIG. 9 is a view of the embodiment of FIG. 7 in complete engagement.

It is apparent that the above drive system is specifically adapted to a drive where the high speed motor is capable of operation in only one direction and the spring form 68 is so oriented that the friction between it and a slower rotating member associated with the drive of the other motor (i.e., extension 36) maintains the foot portion 67 in a position to support the post from moving inwardly into engagement with the notched wheel 26. However, the same principle for determining synchronous reengagement can be utilized for re-establishing a driving connection between the post 66 and the notched wheel 26 irrespective of the direction of rotation of the high speed motor. Such an apparatus is shown in FIGS. 7, 8 and 9.

Referring now to those figures, it is noted the single L shaped wire form 68 previously utilized has been replaced by a pair of oppositely facing L shaped ends 82, 84 of a wire form 86. A plate member 92 having a substantially rectangular configuration, is rockably mounted on the post member 66 for limited rotative movement thereabout as by having an oversized square aperture 93 at generally its midpoint through which the somewhat smaller square post member 66 extends. A pair of headed pins 90 extend from the face of the plate member (one on each side of the post 66)) and the post member 66 has an annular recess as at 95. Thus, the intermediate portion of the wire form 86 is engaged over the head of the headed pins and in a recess of the member 66 on generally opposite sides so that the inherent resiliency of the wire 86 maintains these parts in the assembled position while permitting the rocking or rotation of the plate member 92.

Each leg portion 82, 84 of the wire form 86 is normally biased towards the other and, in proper position with the post portion radially outermost, abuts opposite sides of a tab 94 extending axially from the hub 24 of the centrifugal plate 40 on the same order as the previous shoulder 50. Therefore, assuming the spin motor 14 has been energized to a spin speed to provide sufficient centrifugal force on the slide to disengage the drive between the post 66 and the notched wheel 26, in the same manner as previously described (FIG. 7) and is rotating in the direction of the arrow which is opposite to the direction of the first embodiment, subsequent deenergization of the spin motor and energization of the wash motor re-establishes the drive between the post member 66 and the notched wheel 26 in the following manner: First, as the spin motor slows, the slide becomes responsive to the force of spring 74 which retracts the slide 52 causing the feet portion 82a, 84a of the wire form to engage the bushing 32 of the slower notched wheel 26. In this instance the friction on foot 82a is sufficient to immediately force it radially outwardly (see FIG. 8) and in so doing frees the rockable plate 92 to rotate the permitted amount. This rotation also permits the slide to move inward a limited amount until the further movement of the slide in the direction as urged by spring 74 is resisted by the leg 84 of the wire form supporting the post and preventing engagement between the post and the notched wheel. However, the foot 82a has thus been placed in such a position that there is no chance that the reverse relative rotation (which occurs immediately after a speed of the centrifugal plate has slowed to the speed of the notched wheel) will drag the foot 82a back into a supporting position. Immediately upon reversal of the relative direction of rotation of the centrifugal plate with respect to the extension 36 of bushing 32 associated with the notched wheel, which happens, as stated, immediately past synchronous speed of the two, the dragging force reverses and the remaining wire form 84 supporting the slide 52 moves to an outer position whereupon the slide is no longer supported and the spring 74 causes the post 66 to move into engagement with the notched wheel 26. It is obvious that operation of the spin motor initially in the reverse direction as that described merely changes the sequence of lowering the two L shaped wire forms so that the post 66 reengages the notched wheel at just below synchronous speed irrespective of which direction the spin motor is last operated before deenergization. The final position of the wire forms 82, 84 upon engagement of the post 66 with the notched wheel 26 is best illustrated in FIG. 9.

I claim:

1. A speed responsive clutch mechanism for effecting engagement or disengagement of a first drive means to a driven member, said driven member also drivingly coupled to a second drive means and wherein said first drive means drives said driven member at a relatively low speed in relation to said second drive means, said mechanism comprising;

a first rotational plate drivingly coupled to one of said drive means;

a slide means including a projecting engagement means mounted on said plate for movement to a radially outer position from a first position in response to centrifugal force, means biasing said slide to normally assume said first position, a second rotational plate drivingly coupled to the other of said drive means; said second plate coaxial with said first rotational plate and defining means for drivingly engaging said engagement means when said slide is in said first position; said engagement means and said engaging means being disengaged with respect to one another when said slide it in said radially outer position; and means resiliently biased to a position obstructing movement of said engagement means from said radially outer first position and normally in said position obstructing movement whenever the rotational speed of said first rotational plate is less than provides sufficient centrifugal force to maintain said slide in said radially outer position but greater than the rotational speed of said second plate said biased means subsequently forced to a nonobstructing position permitting said engagement means to move to said first position for driving engagement between said engagement means and said engaging means in response to the rotational speed of said first plate decreasing to a speed less than the rotational speed of said second rotational plate.

2. Structure according to claim 1 wherein said biased means comprises:

a support member for maintaining said engagement means in a disengaged position, said member having one end attached to said slide means and a movable opposite end disposed adjacent an annular portion on said second rotational plate and normally biased to abut said annular member in a slide supporting manner 3. Structure according to claim 2 wherein said first plate includes:

means preventing movement of said opposite end of said support member as urged by friction between said end and said annular member whenever the rotational speed of said first rotational plate is greater than the rotational speed of said second rotational plate; said free end being free to be moved in the opposite direction against the spring bias to a non-supporting position as urged by friction between said annular member and said free end whenever the rotational speed of said first rotational plate is exceeded by the rotational speed of said second rotational plate, whereupon said means biasing said slide to a first position pulls said engagement means into driving position with respect to said engaging means.

4. A speed responsive clutch mechanism for effecting engagement and disengagement of a first drive means drivingly coupled to a driven member, said driven member also drivingly coupled to a second drive means and wherein said first drive means drives said driven member at a speed distinctly less than said second drive means, said mechanism comprising:

a first engaging means drivingly coupled to one of said drive means, said first engaging means including a member mounted for guided movement to a radially outer position under the influence of centrifugal force and a radially inner position under the influence of a return biasing means, said member having a projecting engagement portion;

a second engaging means drivingly coupled to the other of said drive means, and generally adjacent said first engaging means for drivingly engaging said projecting portion when said member is in said radially inner position;

means attached to said member and resiliently urged to a position preventing return movement of said member from said radially outer position to said radially inner position as urged by said biasing means whenever the rotational speed of said second drive means is greater than the rotational speed of said first drive means and permitting said member to subsequently return to said inner position only when said second drive means decreased in speed to just less than the speed of said first drive means.

5. Structure according to claim 4 wherein said means for preventing movement of said member comprises:

a bent wire form having one end attached to said member with the opposite end being movable and resiliently biased to a position providing abutting supportive engagement with an annular rotating member associated with said other of said drive means: and;

wherein said clutch further includes means preventing movement of said movable end to a non-supportive position in a direction as urged by friction between said annular member and said movable end when the rotational speed of said second drive means is greater than the rotational speed of said first drive means, said movable end being able to move in the opposite direction to a non-supportive position as urged by friction, whenever said second drive means attains a rotational speed just less than the rotational speed of said first drive means.

6. A speed responsive clutch mechanism interposed between a first and a second drive means selectively energized to drive a common driven member, and wherein said first drive means imparts a relatively slower speed to said driven member than said second drive means, said clutch mechanism being effective for disengaging the driving connection between said driven member and said first drive means subsequent to said second drive means being energized and said first drive means deenergized, said clutch mechanism including:

a first member drivingly connected to said first drive means, a second member drivingly connected to said second drive means, means movably mounted on said second member and movable between a first position for establishing driving engagement between said first and second members and a second position wherein said first and second members are drivingly disengaged, said movable means being responsive to centrifugal force to move to said second position in opposition to means resiliently urging said movable means to said first position; and means connected to said movable means and defining a portion resiliently urged into a position contacting said first member for supporting said movable means at some intermediate position between said first and second position but in a disengaged relationship between said two members when the rotational speed of said second drive means is less than the speed required to maintain said movable means in said outer position but greater than the speed of said first drive means, said supporting portion frictionally moved to a non-supporting position by said first member whenever the rotational speed of said first drive means subsequently exceeds the rotational speed of said second drive means.

7. Structure according to claim 6 wherein said first and second members are coaxially disposed generally adjacent one another and wherein said means movably mounted on said second member is disposed between said two members and comprises a slide mounted for guided radial movement and defining a portion extending into driving engagement with said adjacent facing first member when said slide is in said first position.

8. Structure according to claim 7 wherein said supporting means connected to said movable means comprises a generally elongated member having one end attached to said slide with the opposite end being generally freely movable;

said opposite end resiliently biased to a position contacting said first member and cooperating therewith to support said slide in said intermediate position; and, means preventing movement of said free end to a non-supporting position against the frictional forces between said free end and said first member when the rotational speed of said first member is less than the rotational speed of said second member, said free end being free to move in the opposite direction to a non-supporting position as urged by said first member whenever the rotational speed of said first member exceeds the rotational speed of said second member.

* * * * *